(12) United States Patent
Swift et al.

(10) Patent No.: US 8,845,291 B2
(45) Date of Patent: Sep. 30, 2014

(54) ENGINE ARRANGEMENT

(75) Inventors: Andrew Swift, Uttoxeter (GB); Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 992 days.

(21) Appl. No.: 12/945,286

(22) Filed: Nov. 12, 2010

(65) Prior Publication Data
US 2011/0142648 A1 Jun. 16, 2011

(30) Foreign Application Priority Data

Dec. 14, 2009 (GB) .................................. 0921745.6

(51) Int. Cl.
*B64C 11/30* (2006.01)
*F02C 3/10* (2006.01)
*F02C 6/20* (2006.01)
*F02K 3/02* (2006.01)

(52) U.S. Cl.
CPC . *F02C 6/206* (2013.01); *F02C 3/10* (2013.01); F05D 2260/40311 (2013.01); F05D 2260/79 (2013.01); *F02K 3/025* (2013.01); F05D 2260/74 (2013.01)
USPC .......................................... 416/160; 416/162

(58) Field of Classification Search
CPC ...... B64C 11/06; B64C 11/065; B64C 11/30; B64C 11/306; B64C 11/308; B64C 11/38; B64C 11/385; B64C 33/42

USPC ................ 416/159, 160, 162, 25, 26; 244/60, 244/53 R, 62, 1 N
See application file for complete search history.

(56) References Cited

U.S. PATENT DOCUMENTS

| 2,804,154 | A | | 8/1957 | Treseder et al. |
| 2,954,830 | A | | 10/1960 | Gehres |
| 3,536,415 | A | * | 10/1970 | Kusiak .......................... 416/160 |
| 2008/0020891 | A1 | * | 1/2008 | Beaven ......................... 475/332 |
| 2010/0008779 | A1 | * | 1/2010 | Carvalho et al. .............. 416/147 |

OTHER PUBLICATIONS

Search Report issued in British Patent Application No. 0921745.6, on Apr. 15, 2010.

* cited by examiner

*Primary Examiner* — Edward Look
*Assistant Examiner* — Adam W Brown
(74) *Attorney, Agent, or Firm* — Oliff PLC

(57) ABSTRACT

An engine arrangement has a gear assembly that drives a first propeller assembly. The gear assembly is driven by a power drive shaft that joins to the gear assembly at a first side. The engine arrangement has a static conduit that extends along a longitudinal internal cavity of the power drive shaft. The conduit penetrates the gear assembly such that a portion of the conduit projects from an opposing second side of the gear assembly. The engine arrangement has one or more first fluid supply lines routed along the static conduit between a hydraulic pressure power source and the first hydraulic actuator. A first hydraulic rotating coupling is mounted to the projecting portion of the static conduit. The first fluid supply lines fluidly communicate with the first hydraulic actuator via the first rotating coupling.

8 Claims, 2 Drawing Sheets

ENGINE ARRANGEMENT

FIELD OF THE INVENTION

The present invention relates to an engine arrangement, and more particularly to an engine arrangement having a propeller assembly in which a hydraulic actuator causes angular displacement of propellers of the propeller assembly.

BACKGROUND OF THE INVENTION

Aero propellers, either single rotor or contra-rotating, usually have a means of varying the blade pitch via a pitch control mechanism (PCM), to optimise efficiency of thrust delivery and to reduce noise throughout the flight envelope, to provide reverse thrust, and to be able to feather the blades to control drag and rotor speed in some powerplant failure cases. There are a number of established ways of configuring a PCM, but all feature a source of power, prime mover, mechanism from prime mover to blade, and a failsafe system. The power source can be in the static or rotating field, although it is more common for it to be in the static field to avoid static to rotating control communication issues and for easier line replacement of faulty components. However, where the power source is in the static field, a means of transferring the power to the rotating field(s) is required.

For a static electrical power source the transfer is typically achieved via slip rings. These are used on single propeller assembly turboprop engines. However, they suffer from a high maintenance burden. Further, on an engine having two contra-rotating propeller assemblies, and particularly such an engine where the exhaust is ducted under the propeller blade roots, the slip rings would experience very high operating speeds which would significantly reduce slip ring life. The high speeds result from a need to locate the rings at large radial distances in a non-oily zone, as well as from the high relative speeds caused by contra-rotation. Thus slip rings are not seen as a viable solution for power source transfer in contra-rotating propeller assemblies.

For a static hydraulic power source, the transfer can be achieved by rotating hydraulic couplings. For example, in a single rotor engine arrangement, the propeller assembly may be driven by a hollow propeller shaft. A rotating hydraulic coupling can be provided at one end of the propeller shaft, with hydraulic supply lines running inside the shaft from the coupling to a PCM prime mover (e.g. a hydraulic actuator) adjacent the propeller blades. The propeller shaft, supply lines and prime mover are all in the rotating field. A hydraulic pressure power source, which is in the static field, supplies hydraulic fluid to the coupling, and thence to the supply lines.

However, a fundamental design constraint on a rotating hydraulic coupling is that the product (PV) of static to rotating interface velocity (V) and hydraulic pressure (P) should be kept within limits to maintain seal life, assuming positive sealing is necessary. Since propeller rotational speed is generally predetermined, reducing the diameter of the rotating interface is thus of prime importance. Even in circumstances where some leakage is permissible from the rotating hydraulic coupling, reducing the rotating interface diameter helps to decrease the amount of that leakage.

Turboprop engines, whether having a single propeller assembly or two contra-rotating propeller assemblies, employ a reduction gearbox. As shown schematically in FIG. 1, such a gearbox 1 can be of a step-aside shaft configuration in which a drive shaft 2 extending from the free power turbine 3 of the engine 4 is laterally offset from the propeller shaft 5 of the propeller assembly 6. In this configuration, a small diameter, and hence low PV value and low leakage hydraulic coupling 7 may be located at the rear of the gearbox on the end of the propeller shaft, which is hollow. As described above, supply lines 8 can run along the inside of the propeller shaft to supply a hydraulic actuator 9, which rotates with the propeller assembly, with hydraulic fluid from a static hydraulic pressure power source 10.

Alternatively, as shown schematically in FIG. 2, the gearbox 1 can be of a coaxial epicyclic configuration, in which typically a sun gear of the gearbox is driven by and coaxial with the drive shaft 2 extending from the free power turbine 3 of the engine 4. However, as the axis of the propeller, gearbox and gas generator are coincident, it is more problematic to arrange for a small diameter hydraulic coupling 7 with an acceptably low PV value and low leakage rate because the static part of the coupling is outside the propeller shaft 5 outer diameter.

EP A 1881176 proposes an arrangement for transferring hydraulic power from a static hydraulic power source to the respective hydraulic actuators of a contra-rotating turboprop engine which avoids the need for rotating hydraulic couplings, even though the engine has in-line coaxial epicyclic gear assembly. In the arrangement, the hydraulic actuators are statically mounted, and the power transfer between the static and rotating fields is achieved by rolling element thrust bearings and associated transfer rods. More particularly, to transfer power to the propeller blade angle adjustment mechanism of the second propeller assembly which is on the other side of the gear assembly from its hydraulic actuator, a first set of transfer rods extend from rolling element thrust bearings at the statically mounted hydraulic actuator through the carrier of the gear assembly planetary gears. As the carrier rotates with the first propeller assembly, a second set of transfer rods then extend from further rolling element thrust bearings between the two sets of rods to the contra-rotating, blade angle adjustment mechanism of the second propeller assembly.

Although the arrangement of EP A 1881176 avoids the use of rotating hydraulic couplings, it raises other issues such as:

(1) The rotor location bearings of the propeller assemblies have to react varying PCM actuation loads as well as contra-rotating propeller thrust loads. To avoid rotor bearing failures associated with load reversal and skidding, the bearings need to be increased in size to withstand the total increased loading. This adds weight, and can also be difficult to achieve within space constraints.

(2) To provide acceptable gear assembly life, appropriate radial and axial stiffnesses between the sun gear, planetary gear carrier and ring gear of the epicylic gear assembly must be achieved. However, the first set of transfer rods extending through the carrier tends to reduce the gear assembly stiffness.

(3) If the first set transfer rods become deformed, e.g. due to gear assembly malfunction, this may compromise the ability of the PCM to adjust the angles of the propeller blades, and in particular to feather the blades to avoid potentially excessive drag and rotor speed.

Thus, it would be desirable to provide an alternative engine arrangement which facilitates the transfer of power to the hydraulic actuator of a propeller assembly.

BRIEF SUMMARY OF THE INVENTION

Accordingly, a first aspect of the present invention provides an engine arrangement having:
a first propeller assembly, a first hydraulic actuator for angular displacement of propellers of the first propeller assembly, the first hydraulic actuator rotating with the first propeller assembly, a gear assembly that drives the first propeller assembly, the gear assembly being driven by a power drive shaft that joins to the gear assembly at a first side thereof, the power drive shaft having a longitudinally extending internal cavity, a static conduit which extends along the internal cavity of the power drive shaft, the conduit penetrating the gear assembly such that a portion of the conduit projects from an opposing second side of the gear assembly, and one or more first fluid supply lines for transferring hydraulic fluid between a hydraulic pressure power source located on a static structure of the engine arrangement and the first hydraulic actuator, the first fluid supply lines being routed along the static conduit;

wherein a first hydraulic rotating coupling is mounted to the projecting portion of the static conduit, the first fluid supply lines fluidly communicating with the first hydraulic actuator via the first rotating coupling.

Advantageously, as the static conduit extends along the internal cavity of the power drive shaft, the first hydraulic rotating coupling mounted to the projecting portion of the static conduit can have a relatively small diameter and thus can provide a low PV value and low leakage rate.

The engine arrangement may have any one or, to the extent they are compatible, any combination of the following optional features.

The arrangement can be used for engines having a single propeller assembly. However, preferably the engine arrangement is for a contra-rotating engine, the arrangement further having:

a second propeller assembly arranged to rotate in an opposite direction to the first propeller assembly, the gear assembly also driving the second propeller assembly, a second hydraulic actuator for angular displacement of propellers of the second propeller assembly, the second hydraulic actuator rotating with the second propeller assembly, and one or more second fluid supply lines for transferring hydraulic fluid between the hydraulic pressure power source and the second hydraulic actuator, the second fluid supply lines being routed along the static conduit, wherein a second hydraulic rotating coupling is mounted to the projecting portion of the static conduit, the second fluid supply lines fluidly communicating with the second hydraulic actuator via the second rotating coupling.

Thus the engine arrangement, when used for a contra-rotating engine, can provide hydraulic power to both hydraulic actuators. Advantageously, the arrangement can avoid the issues associated with the arrangement of EP A 1881176, such as increased loading on, and so increased weight of, propeller assembly rotor location bearings, and/or reduced stiffness in the gear assembly. The arrangement can also avoid a potential for axial jamming of the transfer rods of EP A 1881176, and a consequent inability to feather the propeller blades to control drag and rotor speed.

Typically, the gear assembly is an epicyclic gear assembly having e.g. a sun gear, and planetary gears driven by the sun gear and in turn driving a carrier. For example, the power drive shaft can drive the sun gear, and the carrier can drive the first propeller assembly. The epicyclic gear assembly may further have a ring gear driven by the planetary gears. In the context of a contra-rotating engine, the ring gear can drive the second propeller assembly.

Conveniently, the static conduit may penetrate an epicyclic gear assembly through the sun gear, which can help to avoid or reduce detrimental effects on gear assembly stiffness. Further, even if the gear assembly malfunctions, the ability of the fluid supply lines to transfer hydraulic fluid along the static conduit is unlikely to be compromised.

The first propeller assembly and the first hydraulic actuator may be located at the first side of the gear assembly, the first fluid supply lines being re-routed through the gear assembly between the first hydraulic rotating coupling and the first hydraulic actuator. Such an arrangement may be adopted, for example, in relation to a contra-rotating engine. Thus when the gear assembly is an epicyclic gear assembly and the first propeller assembly is driven by a carrier of the gear assembly, the first fluid supply lines may be re-routed through the planetary gears and carrier of the gear assembly. In such an arrangement, the first fluid supply lines may penetrate one or more of the planetary gears and/or pass between at least some of the planetary gears. Although this can leave the first fluid supply lines potentially vulnerable to gear assembly failure or malfunction, the fluid supply lines typically have a significantly smaller diameter than the transfer rods of EP A 1881176, whereby the effect of the fluid supply lines on gear assembly performance (e.g. gear assembly stiffness) can be reduced. Also, an axial jamming failure mode can be avoided.

In the context of an engine arrangement for a contra-rotating engine, the second propeller assembly and the second hydraulic actuator are preferably located at the second side of the gear assembly.

The, or each, hydraulic actuator can be connected to the respective propellers to cause angular displacement thereof in a number of ways. For example, the actuator can drive a corresponding axial motion unison ring, which in turn moves a lever arm or cam follower at the end of a quill shaft extending from the base of each propeller.

A second aspect of the present invention provides a gas turbine engine having an engine arrangement according to the first aspect (the engine arrangement optionally having any one, or to the extent they are compatible, any combination of the optional features of the first aspect), the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially rearwardly from the power turbine section, wherein a forward mouth of the static conduit opens to a gap formed between the forwardly extending generator drive shafts and the rearwardly extending power drive shaft, the fluid supply lines from the hydraulic pressure power source entering the static conduit at said mouth.

The gap thus provides a convenient means for routing the fluid supply lines into the static conduit.

The engine may have any one or, to the extent they are compatible, any combination of the following optional features.

Typically, the gas turbine engine is axially aligned with the gear assembly, which is preferably an epicyclic gear assembly.

The gas turbine engine may have a row of nozzle guide vanes located at said gap, the fluid supply lines being routed through one or more of the nozzle guide vanes to arrive at said mouth. The nozzle guide vanes can thus protect the fluid supply lines from high working gas temperatures at the exit of the generator section of the engine.

Conveniently, the static structure on which the hydraulic pressure power source is located can be an accessory gearbox of the engine.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
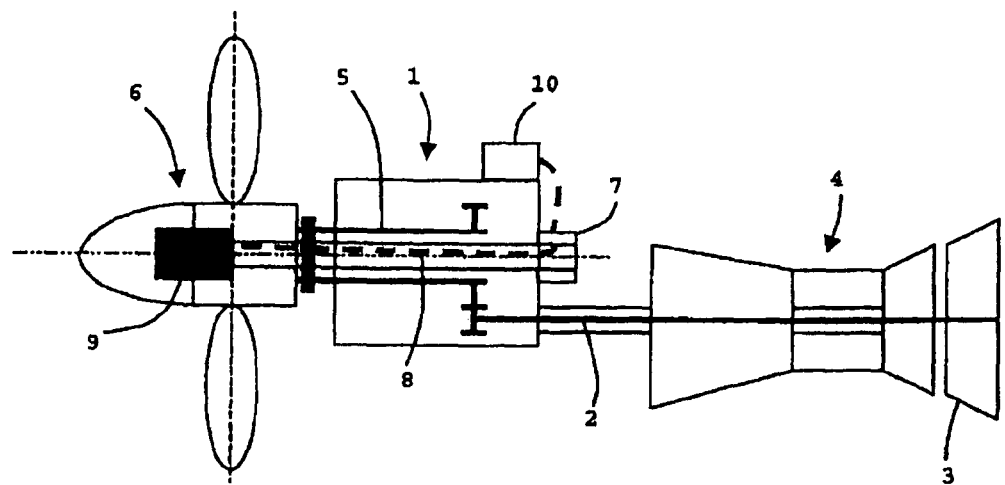
FIG. 1 shows a schematic longitudinal cross-section through a single propeller turboprop engine with a step-aside shaft configuration.
Figure 2:
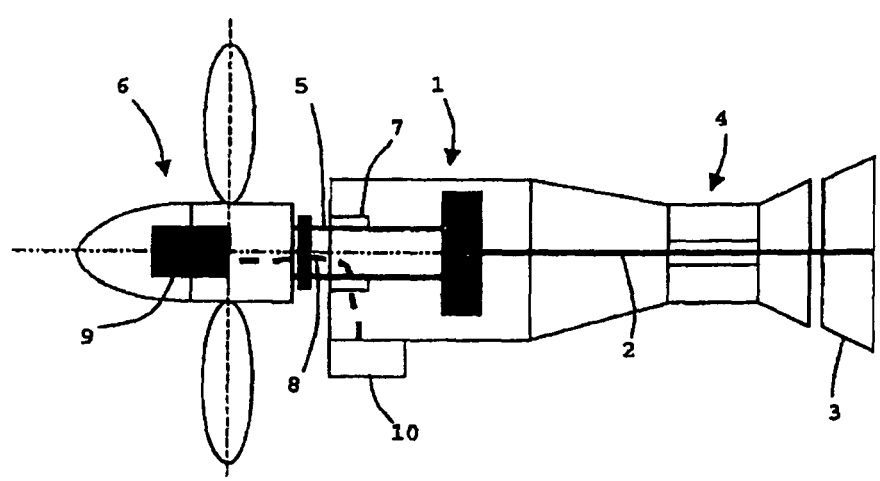
FIG. 2 shows a schematic longitudinal cross-section through a single propeller turboprop engine with an in-line shaft configuration.
Figure 3:
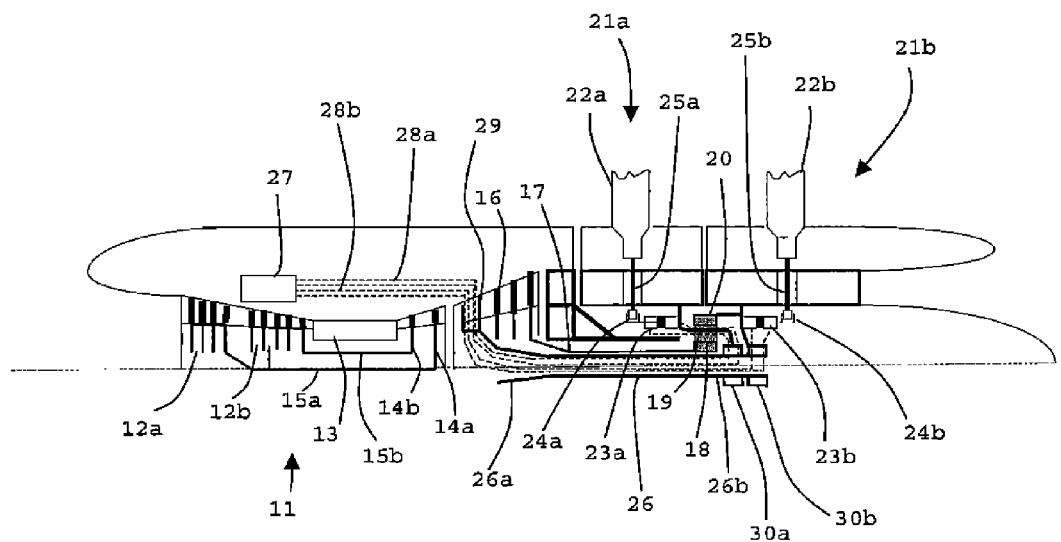
FIG. 3 shows a schematic longitudinal cross-section through a pusher style, contra-rotating propeller, turboprop engine with an in-line shaft configuration according to an embodiment of the present invention.

An engine according to an embodiment of the present invention is shown in FIG. 3. The engine has a generator section 11 comprising in flow series low pressure 12a and high pressure 12b compressor subsections, a combustor subsection 13, and high pressure 14b and low pressure 14a turbine subsections. Generator drive shafts 15a, 15b connect the respective compressor and turbine subsections. Downstream of the generator section is a free power turbine 16 which drives a rearwardly extending power drive shaft 17.

The distal end of the power drive shaft 17 drives a sun gear 18 of an epicyclic gear assembly which is coaxial with the power drive shaft. The sun gear drives planetary gears 19, which in turn drive a carrier (not shown) and a ring gear 20. The carrier and ring gear rotate in opposite directions. The carrier drives a first propeller assembly 21a on the upstream side of the gear assembly, while the ring gear drives a contra-rotating second propeller assembly 21b on 3.o the downstream side of the gear assembly. Each propeller assembly has a row of propeller blades 22a, 22b, with each blade being rotatable about its longitudinal axis to vary the blade pitch. The pitch variation for each propeller assembly is achieved by a respective hydraulic actuator 23a, 23b which moves a corresponding unison ring 24a, 24b in the axial direction of the engine. The axial movement of the unison rings rotates the blades via a quill shaft and lever or cam follower arrangement 25a, 25b which extends from the base of each blade.

The power drive shaft 17 is hollow and a static conduit or central oil tube (COT) 26 extends along the internal cavity formed by the shaft. One end of the COT opens to a mouth 26a at the gap formed between the forward end of the power drive shaft and the rearward end of the low pressure generator drive shaft 15a. The other end of the COT penetrates through the centre of the sun gear 18 to form a projection 26b on the downstream side of the gear assembly. A hydraulic pressure power source 27 (comprising e.g. a hydraulic pump, valves and control unit) for actuating the actuators 23a, 23b is attached to an accessory gearbox (not shown) of the engine remote from the actuators 23a, 23b. The hydraulic fluid is typically filtered engine oil.

To transfer hydraulic fluid between the power source 27 and the actuators 23a, 23b, respective fluid supply lines 28a, 28b are routed from the source to the mouth 26a of the COT 26. The supply lines traverse the working gas annulus of the engine through a row of nozzle guide vanes 29 which are located between the generator section 11 and the free power turbine 16. This arrangement protects the supply lines from the high temperatures of the working gas. From the mouth of the COT, the supply lines are routed along the COT's internal cavity to arrive at the projection 26b on the downstream side of the gear assembly. A pair of axially spaced hydraulic rotating couplings 30a, 30b are mounted to the projection, the upstream one associated with the hydraulic actuator 23a of the first propeller assembly 21a and the downstream one associated with the hydraulic actuator 23b of the second propeller assembly 21b. The internal sides of the couplings are formed by static fluid distributors while the external side of the upstream coupling 30a has a rotating sleeve that is driven by a drive bracket from the first propeller assembly 21a and the external side of the downstream coupling 30b has a rotating sleeve that is contra-driven by a drive bracket from the second propeller assembly 21b. Fluid is transmitted across upstream coupling 30a for those supply lines 28a which are routed to the hydraulic actuator 23a of the first propeller assembly, while fluid is transmitted across downstream coupling 30b for the remaining supply lines 28b which are routed to the hydraulic actuator 23b of the second propeller assembly.

The route taken by the supply lines 28b from the downstream coupling 30b to the hydraulic actuator 23b of the second propeller assembly 21b can be relatively direct. In contrast, the route taken by the supply lines 28a from the upstream coupling 30a to the hydraulic actuator 23a of the first propeller assembly 21a is more complicated as it passes through the gear assembly. Conveniently, the supply lines 28a are routed through the planetary gears 19 and carrier, which rotate with the first propeller assembly.

The COT can also be used to route other power lines or control lines through the engine, these lines being e.g. hydraulic or electrical.

The engine arrangement of this embodiment of the invention overcomes problems with conventional propeller PCMs, particularly when applied to a pusher style contra-rotating open rotor with an in-line differential power gearbox. In particular, the arrangement of the COT 26 and the hydraulic rotating couplings 30a, 30b mounted to the COT projection 26b allows small diameter couplings to be used and hence low PV values and low leakage rates can be achieved. Further the stiffness of the gear assembly is not substantially compromised by the COT extending through the sun gear 18. Also the potential for axial jamming of the transfer rods (used in EPA 1881176) and a consequent inability to feather the propeller blades to control drag and rotor speed is avoided.

Thus the present invention enables a propeller PCM system that benefits from the advantages of remote, and therefore easily line replaceable, statically mounted controls (which can use, for example, existing turbofan control architecture technologies, rather than flight safety critical, wireless communication technologies). It can achieve this with an in-line gearbox configuration without recourse to e.g. electrical slip rings or rolling element thrust bearings at a diameter of coupling that leads to acceptable PV and leakage levels.

While the invention has been described in conjunction with the exemplary embodiments described above, many equivalent modifications and variations will be apparent to those skilled in the art when given this disclosure. For example, although the invention has been described above in relation to aero engines, it could also be applied to marine engines. Accordingly, the exemplary embodiments of the invention set forth above are considered to be illustrative and not limiting. Various changes to the described embodiments may be made without departing from the spirit and scope of the invention.

The invention claimed is:
1. An engine arrangement having:
a first propeller assembly, a first hydraulic actuator for angular displacement of propellers of the first propeller assembly, the first hydraulic actuator rotating with the first propeller assembly, a gear assembly that drives the first propeller assembly, the gear assembly being driven by a power drive shaft that joins to the gear assembly at a first side thereof, the power drive shaft having a longitudinally extending internal cavity, a static conduit which extends along the internal cavity of the power drive shaft, the conduit penetrating the gear assembly such that a portion of the conduit projects from an opposing second side of the gear assembly, and one or more first fluid supply lines for transferring hydraulic fluid between a hydraulic pressure power source located on a static structure of the engine arrangement and the first hydraulic actuator, the first fluid supply lines being routed along the static conduit;

wherein a first hydraulic rotating coupling is mounted to the projecting portion of the static conduit, the first fluid supply lines fluidly communicating with the first hydraulic actuator via the first rotating coupling.

2. An engine arrangement according to claim 1 which is for a contra-rotating engine, the arrangement further having:

a second propeller assembly arranged to rotate in an opposite direction to the first propeller assembly, the gear assembly also driving the second propeller assembly, a second hydraulic actuator for angular displacement of propellers of the second propeller assembly, the second hydraulic actuator rotating with the second propeller assembly, and one or more second fluid supply lines for transferring hydraulic fluid between the hydraulic pressure power source and the second hydraulic actuator, the second fluid supply lines being routed along the static conduit, wherein a second hydraulic rotating coupling is mounted to the projecting portion of the static conduit, the second fluid supply lines fluidly communicating with the second hydraulic actuator via the second rotating coupling.

3. An engine arrangement according to claim 1, wherein the gear assembly is an epicyclic gear assembly having a sun gear and planetary gears driven by the sun gear and in turn driving a carrier.

4. An engine arrangement according to claim 3, wherein the static conduit penetrates the epicyclic gear assembly through the sun gear.

5. An engine arrangement according to claim 1, wherein the first propeller assembly and the first hydraulic actuator are located at the first side of the gear assembly, the first fluid supply lines being re-routed through the gear assembly between the first hydraulic rotating coupling and the first hydraulic actuator.

6. An engine arrangement according to claim 1, wherein the gear assembly is an epicyclic gear assembly having a sun gear and planetary gears driven by the sun gear and in turn driving a carrier wherein the first propeller assembly and the first hydraulic actuator are located at the first side of the gear assembly, the first fluid supply lines being re-routed through the gear assembly between the first hydraulic rotating coupling and the first hydraulic actuator wherein the first fluid supply lines are re-routed through the planetary gears and carrier of the gear assembly.

7. A gas turbine engine having an engine arrangement according to claim 1, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially rearwardly from the power turbine section, wherein a forward mouth of the static conduit opens to a gap formed between the forwardly extending generator drive shafts and the rearwardly extending power drive shaft, the fluid supply lines from the hydraulic pressure power source entering the static conduit at said mouth.

8. A gas turbine engine according to claim 7 wherein a row of nozzle guide vanes are located at said gap, the fluid supply lines being routed through one or more of the nozzle guide vanes to arrive at said mouth.

\* \* \* \* \*